(12) United States Patent
Matsushima

(10) Patent No.: US 10,481,571 B2
(45) Date of Patent: Nov. 19, 2019

(54) ROBOT CONTROLLER WHICH AUTOMATICALLY SETS INTERFERENCE REGION FOR ROBOT

(71) Applicant: FANUC CORPORATION, Yamanashi (JP)

(72) Inventor: Tomonori Matsushima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 50 days.

(21) Appl. No.: 15/825,437

(22) Filed: Nov. 29, 2017

(65) Prior Publication Data

US 2018/0157230 A1 Jun. 7, 2018

(30) Foreign Application Priority Data

Dec. 1, 2016 (JP) ................................. 2016-234240

(51) Int. Cl.
*B25J 9/16* (2006.01)
*G05B 19/02* (2006.01)
(Continued)

(52) U.S. Cl.
CPC ............ *G05B 19/02* (2013.01); *B25J 9/1676* (2013.01); *G05B 19/4061* (2013.01); *G06T 7/50* (2017.01);
(Continued)

(58) Field of Classification Search
CPC ... G06T 7/70; G06T 2207/10025; G06T 7/50; B25J 9/1666; B25J 9/1676; G05B 2219/4061; G05B 2219/49157; G05B 2219/39031; G05B 2219/49137; G05B 2219/37631; G05B 2219/40442; G05B 2219/40613

See application file for complete search history.

(56) References Cited

U.S. PATENT DOCUMENTS 9,026,234 B2  5/2015  Suzuki
9,233,469 B2  1/2016  Lee et al.
(Continued)

FOREIGN PATENT DOCUMENTS

CN  102528811 A  7/2012
CN  103568022 A  2/2014
(Continued)

*Primary Examiner* — Dale Moyer
(74) *Attorney, Agent, or Firm* — RatnerPrestia

(57) ABSTRACT

A robot controller able to automatically set an motion range for a robot, in which the robot and an obstacle, such as a peripheral device, do not interfere with each other. The robot controller includes a depth acquisition section acquiring a group of depth data representing depths from a predetermined portion of the robot to points on the surface of an object around the robot, a robot position acquisition section acquiring three-dimensional position information of the predetermined portion, a depth map generator generating depth map information including three-dimensional position information of the points with using the group of depth data and the three-dimensional position information, and an interference region setting section estimating the range occupied by the object from the depth map information and setting the range as an interference region.

5 Claims, 3 Drawing Sheets

(51) Int. Cl.
*G06T 7/50* (2017.01)
*G06T 7/70* (2017.01)
*G05B 19/4061* (2006.01)
*G06T 1/00* (2006.01)

(52) U.S. Cl.
CPC ...... *G06T 7/70* (2017.01); *G05B 2219/40179* (2013.01); *G05B 2219/40563* (2013.01); *G06T 1/0007* (2013.01); *G06T 2207/10028* (2013.01)

(56) References Cited

U.S. PATENT DOCUMENTS

| | | | |
|---|---|---|---|
| 9,584,796 | B2 | 2/2017 | Nishi et al. |
| 2014/0025203 | A1 | 1/2014 | Inazumi |
| 2015/0217455 | A1* | 8/2015 | Kikkeri ................ B25J 9/1676 700/259 |
| 2016/0016315 | A1* | 1/2016 | Kuffner, Jr. ........... B25J 9/1676 700/255 |
| 2016/0112694 | A1* | 4/2016 | Nishi .................... G01B 11/14 348/47 |
| 2017/0136626 | A1* | 5/2017 | Wang ...................... G06T 7/74 |
| 2017/0282369 | A1* | 10/2017 | Hull ...................... B25J 9/1676 |
| 2017/0316253 | A1* | 11/2017 | Phillips .................... G06T 7/74 |

FOREIGN PATENT DOCUMENTS

| | | |
|---|---|---|
| CN | 105522592 A | 4/2016 |
| CN | 106054900 A | 10/2016 |
| DE | 102013018638 A1 | 5/2015 |
| DE | 102014102943 A1 | 8/2015 |
| DE | 102015013161 A1 | 4/2016 |
| EP | 0380513 B1 | 6/1997 |
| JP | 2000094374 A | 4/2000 |
| JP | 2003-136466 A | 5/2003 |
| JP | 2012243138 A | 12/2012 |
| JP | 2013-136123 A | 7/2013 |
| JP | 2013186088 A | 9/2013 |
| JP | 2014021810 A | 2/2014 |
| JP | 2014161950 A | 9/2014 |
| JP | 2015062991 A | 4/2015 |
| JP | 2016078184 A | 5/2016 |

\* cited by examiner

ROBOT CONTROLLER WHICH AUTOMATICALLY SETS INTERFERENCE REGION FOR ROBOT

CROSS-REFERENCE TO RELATED APPLICATIONS

This application is a new U.S. Patent Application that claims benefit of Japanese Patent Application No. 2016-234240, filed Dec. 1, 2016, the disclosure of this application is being incorporated herein by reference in its entirety for all purposes.

BACKGROUND OF THE INVENTION

1. Field of the Invention

The invention relates to a robot controller including the function of setting a region (to be referred to as an interference region hereinafter) with which a robot may interfere.

2. Description of the Related Art

On a production factory floor, when a robot is used to supply workpieces to a machine tool or remove finished products after machining from the machine tool, the robot is placed near the machine tool and a safety fence is also placed around the robot. In this case, the user actually operates the robot using, e.g., a teach pendant connected to a robot controller to teach the robot a task operation which may not allow, e.g., the arms or hands of the robot to extend out of the safety fence. The user creates an operation program for the robot by such a teaching task or offline programming and stores it in the robot controller.

Unfortunately, the robot itself may not recognize the information of structures placed around the robot, i.e., that the safety fence or peripheral devices such as a belt conveyor are located around the robot. Therefore, during a user teaching task or during execution of the operation program for the robot, the robot may interfere with any peripheral device or the like due to a user operation error or a program error, thus damaging the peripheral device or the robot. As a result, production is kept stopped until recovery of the damaged peripheral device or robot and then the productivity significantly lowers.

Under the circumstances, a range in which the robot can operate (to be referred to as an operation range hereinafter) is preset in the robot controller, and when the robot deviates from the set operation region, the robot is stopped to prevent interference between the robot and the peripheral devices. A method of this type (to be referred to as background-art technique 1 hereinafter) is disclosed in, e.g., Japanese Unexamined Patent Publication (Kokai) No. 2013-136123.

Another method is practiced in which a sensor which detects obstacles is mounted on the robot, and when the sensor detects any obstacle during execution of the operation program by the robot, the robot is kept stopped until removal of the obstacle. A method of this type (to be referred to as background-art technique 2 hereinafter) is disclosed in, e.g., Japanese Unexamined Patent Publication (Kokai) No. 2003-136466.

However, in background-art technique 1, the user may preferably input an operation range for the robot to the robot controller in advance in accordance with the position information of the peripheral devices. In this case, since the user generally measures a position from the robot and stores it in the robot controller, and this is laborious. In setting an operation range for the robot, a relatively wide margin or the like tends to be set for safety. This poses a problem in which the robot stops due to the influence of the margin, although the robot seems still far from the obstacles. In particular, when the robot is used to supply workpieces to a machine tool or remove finished products after machining from the machine tool, peripheral devices are often deployed densely, so the above-mentioned problem readily becomes conspicuous.

When the user changes the arrangement of peripheral devices, he or she may preferably set an operation range for the robot again accordingly, and this is likely to be laborious.

In contrast to this, in background-art technique 2, since no operation range for the robot may be input to the robot controller in advance, no problem as described earlier occurs. However, in background-art technique 2, since a sensor which detects obstacles may be preferably mounted for each robot, the cost increases enormously.

SUMMARY OF INVENTION

In consideration of the above-described situation, it is an object of the disclosure to provide a robot controller which can automatically set an operation range of a robot in which the robot and obstacles such as peripheral devices do not interfere with each other.

According to an aspect, a robot controller configured to control an operation of a robot, including a depth acquisition section configured to acquire a group of depth data representing depths from a predetermined portion of the robot to a plurality of points on a surface of an object located around the robot; a robot position acquisition section configured to acquire three-dimensional position information of the predetermined portion; a depth map generator configured to generate depth map information including three-dimensional position information of the plurality of points with reference to a installation position of the robot as an origin, with using the group of depth data and the three-dimensional position information of the predetermined portion; and an interference region setting section configured to estimate a range occupied by the object from the depth map information, and set the range as an interference region for the robot.

According to the above-described aspect, it is possible to automatically set a motion range of a robot, in which the robot and an obstacle, such as a peripheral device, do not interfere with each other.

BRIEF DESCRIPTION OF THE DRAWINGS

The above-mentioned and other objects, features, and advantages of the invention will become more apparent from the detailed description of embodiments of the disclosure illustrated in the accompanying drawings, in which.

DETAILED DESCRIPTION

Figure 1:
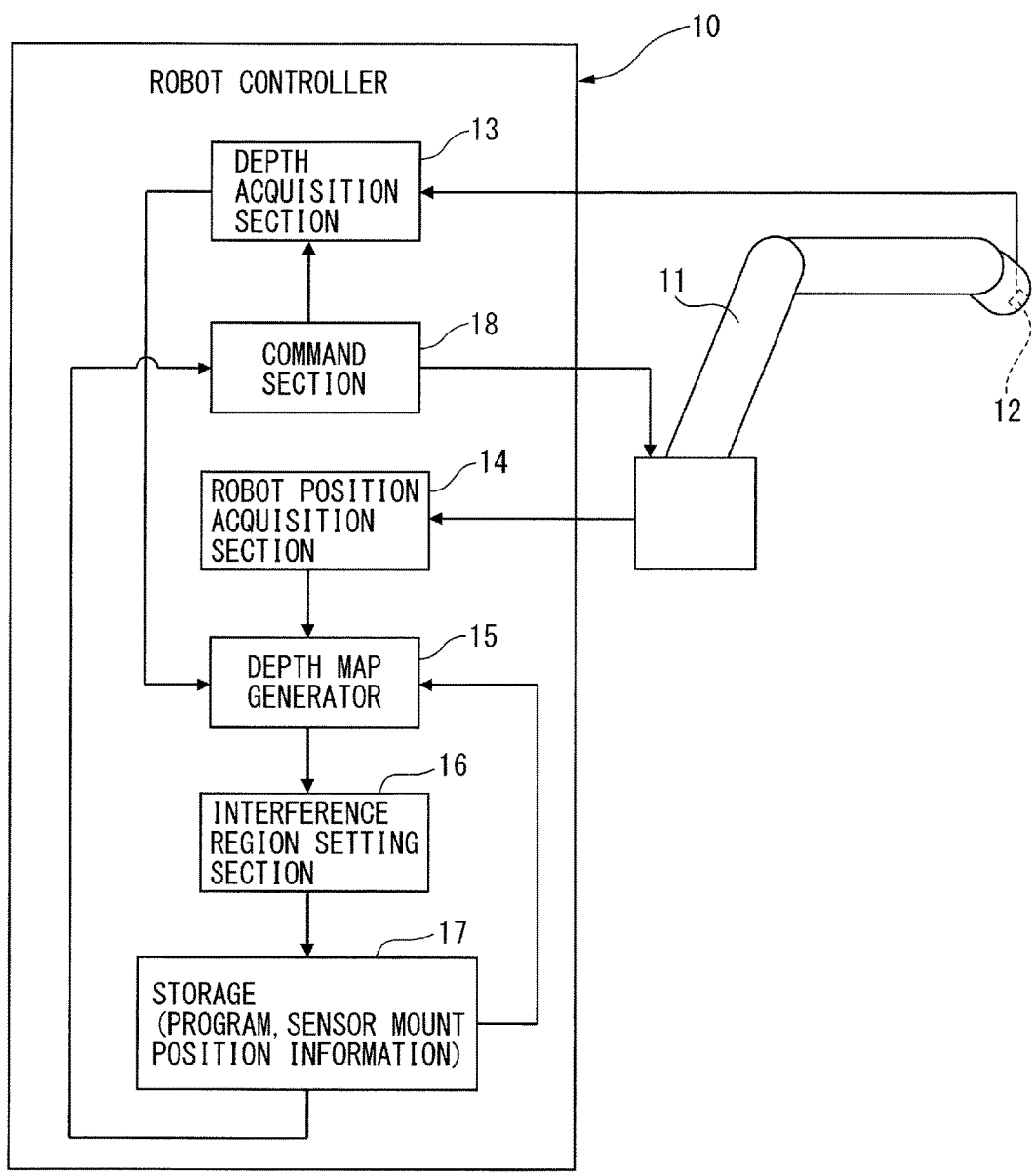
FIG. 1 is a functional block diagram for explaining a function of a robot controller according to an embodiment.

Embodiments of the invention will be described below with reference to the drawings. In the drawings to be referred to, similar components or functional parts are assigned the same reference numerals. In order to facilitate an understanding, the scales of the drawings are appropriately changed. Each embodiment illustrated in the drawings is merely an example for carrying out the invention, and the invention is not limited to the illustrated embodiment.

FIG. 1 is a functional block diagram for explaining a function of a robot controller according to an embodiment. A robot controller 10 according to this embodiment is a device configured to control the operation of a robot 11, and includes a depth acquisition section 13, a robot position acquisition section 14, a depth map generator 15, and an interference region setting section 16.

Examples of the robot 11 include any type of robot such as a vertical articulated robot, a movement mechanism robot, a parallel link robot, and a direct drive mechanism robot.

The depth acquisition section 13 is configured to acquire a group of depth data representing the depths from a predetermined portion of the robot 11 to a plurality of points on a surface of an object (not illustrated) located around the robot 11. The object is a structure placed around the robot 11, e.g., a peripheral device such as a belt conveyor, or a safety fence.

The group of depth data is a set of depth data for each of the plurality of points defined in a matrix with respect to the surface of the object located around the robot 11. Such a group of depth data can be acquired with using a known depth sensor which measures a depth.

Such a depth sensor 12 is preferably attached to the predetermined portion of the robot 11 only when an interference region for the robot 11 is set. The predetermined portion may be a distal end of the robot 11, such as a wrist flange to which a tool or a gripping hand is detachably attached in a distal end of a robot arm.

The robot position acquisition section 14 is configured to acquire three-dimensional position information of the predetermined portion of the above-mentioned robot 11. The three-dimensional position information relates to the three-dimensional position of the predetermined portion of the robot 11 in a real space where the robot 11 is installed.

If the robot 11 is an articulated robot for example, each joint of the articulated robot includes a drive shaft driven by a servomotor (not illustrated) so as to rotate the robot arms. The robot position acquisition section 14 can read the rotational position (angle) of each drive shaft of the robot 11 from a position detector such as a pulse coder arranged in this drive shaft, and acquire the position of the distal end of each robot arm from these rotational angles and the known set dimensions of this robot arm.

The thus-acquired position information of the predetermined portion of the robot 11, e.g., the position information of the distal end of the robot arm, is three-dimensional position information defined in a coordinate system (hereinafter, referred to as "robot coordinate system") having the installation position of the robot 11 as its origin. If the robot 11 is installed in a factory, the above-mentioned installation position is a position of a portion in which the robot 11 is fixed on the floor of the factory.

The depth map generator 15 is configured to generate depth map information with using the group of depth data and the three-dimensional position information of the robot 11 as described earlier. The depth map information includes three-dimensional position information of a plurality of points defined in a matrix on the surface of the above-mentioned object. The three-dimensional position information are obtained by transforming depth data at each point on the surface of the object acquired by the depth sensor 12 into a three-dimensional position with reference to the installation position of the robot 11 as the origin. In other words, the depth data at each point on the surface of the object defined in a coordinate system (hereinafter, referred to as "sensor coordinate system") having the depth sensor 12 as its origin is transformed into three-dimensional position information defined in the robot coordinate system by coordinate transformation.

The interference region setting section 16 is configured to receive the depth map information, retrieve the range occupied by the object located around the robot 11 from the depth map information, and set this range as an interference region for the robot 11. The interference region setting section 16 may set a region other than the retrieved range as an operation-enabled region for the robot 11.

The robot controller 10 according to this embodiment preferably further includes e.g. a storage 17 and a command section 18.

The storage 17 stores the interference region set as described above, an operation program for the robot 11, and information (hereinafter, referred to as "sensor mount position information") relating to the position on the robot 11 at which the depth sensor 12 is mounted.

The command section 18 can output to the depth acquisition section 13 or the robot 11 a command for starting to set the interference region for the robot 11. Further, the command section 18 is configured to send an operation command based on the operation program for the robot 11 to the robot 11, in consideration of the set interference region.

If the robot 11 is an articulated robot for example, the robot controller 10 is configured to perform feedback control of a servomotor (not illustrated) for driving each shaft of the articulated robot so as to operate the arms of the articulated robot.

The command section 18 generates a command for operating the robot 11 in accordance with the pre-constructed operation program, and outputs it to the servomotor. Alternatively, the command section 18 outputs to the servomotor an operation command from a teach pendant connected to the robot controller 10. In this case, when a position command value which may allow the robot 11 to enter the set interference region is output, the command section 18 outputs a command to stop or decelerate the servomotor.

The robot controller 10 may be comprised of a computer system including e.g. a storage, a CPU (Control Processing Unit), and a communication section connected to each other via a bus. The storage may be e.g. a ROM (Read Only Memory) or a RAM (Random Access Memory). Further, the functions and operations of the depth acquisition section 13, the robot position acquisition section 14, the depth map generator 15, and the interference region setting section 16 of the robot controller 10 can be achieved by executing the program stored in the ROM by the CPU.

Figure 2:
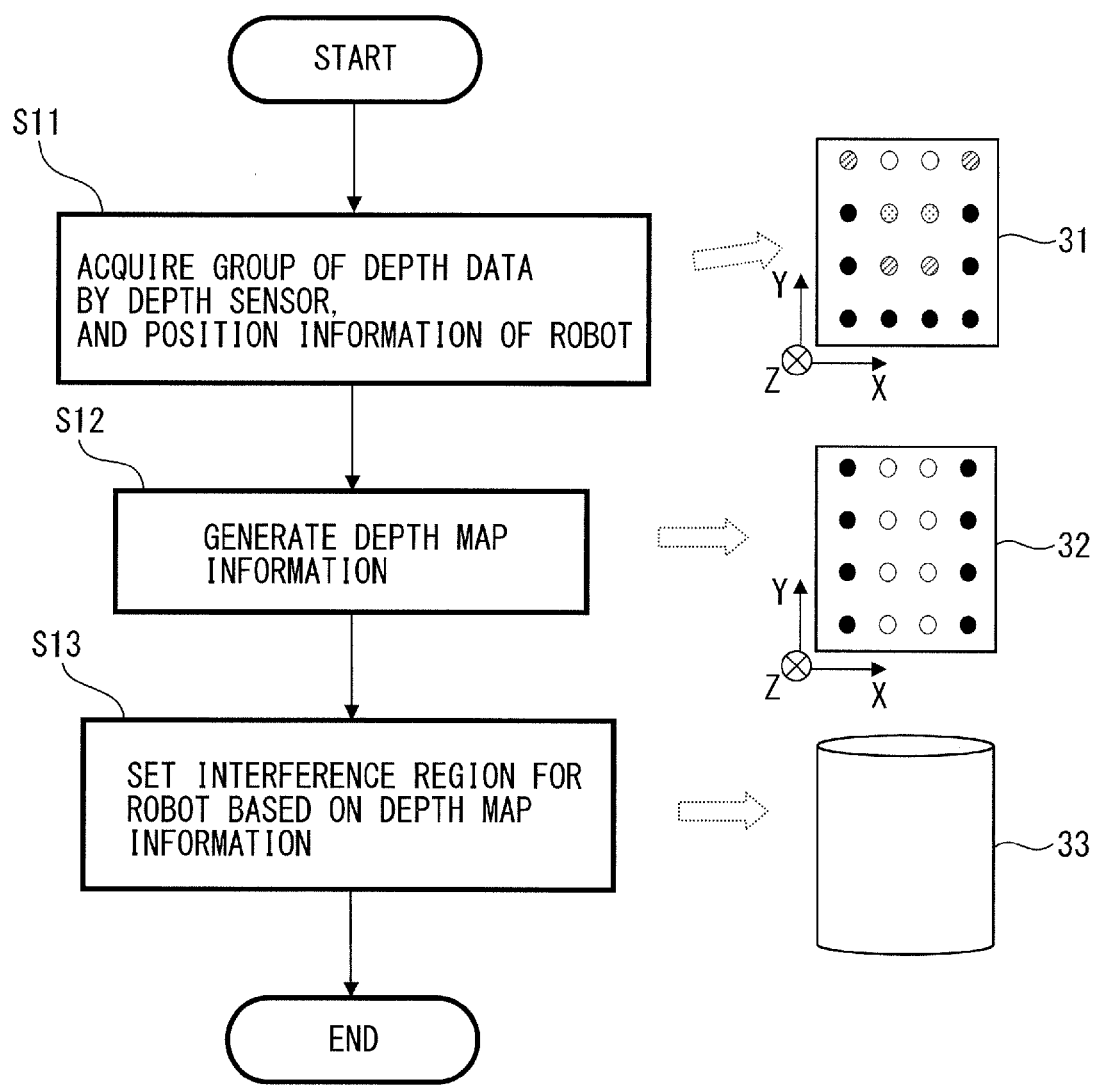
FIG. 2 is a schematic diagram illustrating an interference region setting flow according to an embodiment.

FIG. 2 is a diagram schematically illustrating an embodiment of an interference region setting flow to be executed by the robot controller 10. Not that, at the start of setting the interference region for the robot 11, the depth sensor 12 is mounted at the distal end of the robot 11 in this embodiment.

When setting of the interference region is started, at step 11, the depth acquisition section 13 acquire the group of depth data of the plurality of points on the surface of the object located around the robot 11, by the depth sensor 12.

The group of depth data is a set of depth data at each point defined in a matrix on the surface of the object, and can be acquired as an image (so-called, depth image) 31 illustrated in FIG. 2, for example. The Z-direction (a direction perpendicular to the drawing) of the depth image 31 indicates the depth, and points constituting the depth image 31 are displayed in various shades in response to their depth. Note that, FIG. 2 schematically indicates the points constituting the depth image 31 by white, black, dot-pattern, and hatched circles, for easy understanding. For example, the depth is smaller in white circles than in black circles.

Further, at this step 11, the robot position acquisition section 14 acquires the position information of the robot 11. The position information of the robot 11 acquired at this time is position information of the distal end of the robot 11 where the depth sensor 12 is mounted. This position information of the distal end is acquired in a state where the robot 11 is stopped.

At step 12, the depth map generator 15 generates depth map information with using the group of depth data and the position information of the robot 11 acquired as described above. More specifically, the depth map generator 15 generates the depth map information by transforming the depth data at each point on the surface of the object defined in the sensor coordinate system into three-dimensional position information defined in the robot coordinate system by means of coordinate transformation. The depth map information is preferably acquired as a depth image, similar as the group of depth data. In a depth image 32 illustrated in FIG. 2, the points constituting the depth image 32 are schematically indicated, for easy understanding. For example, the depth is smaller in white circles than in black circles.

When generating the depth map information as described above, the information (hereinafter, referred to as "sensor mount position information") relating to the position at which the depth sensor 12 is mounted at the distal end of the robot 11 and the design dimensions of the depth sensor 12 are preferably taken into consideration. When the depth sensor 12 having a certain outer shape is mounted at the outside of the distal end of the robot 11, a reference point when the depth sensor 12 measures a depth may not coincide with the position of the distal end of the robot 11 acquired at step 11. Therefore, it is preferable to obtain the relative position between the measurement reference point of the depth sensor 12 and the distal end of the robot 11 from the sensor mount position information, and generate the depth map information in consideration of this relative position, as well as the group of depth data and the position information of the robot 11 described above. The sensor mount position information is a known value, and therefore can be pre-stored in the storage 17 of the robot controller 10. The depth map generator 15 preferably reads out it from the storage 17 so as to use it when generating the depth map information.

At step 13, the interference region setting section 16 sets the interference region for the robot 11, based on the depth map information. At this time, the range occupied by the object located around the robot 11 is retrieved from the depth map information, and set as the interference region for the robot 11.

At this step 13, it is preferable to estimate the shape of the object located around the robot 11 from the depth map information, transform this shape into a simplified shape, and set the range occupied by the simplified shape as the interference region for the robot 11. For example, a cylindrical interference region 33 illustrated in FIG. 2 is set. Of course, the shape of the interference region 33 is not limited to such a cylindrical shape.

By the above-mentioned processing flow, setting of the interference region is ended. The information of the set interference region is stored in the storage 17 of the robot controller 10. The stored interference region information is used to restrict the motion range of the robot 11 upon the execution of the operation program or teaching task for the robot 11.

According to the robot controller 10 of an embodiment as described above, the following effects are obtained.

The depth sensor 12 can be mounted at a predetermined portion of the robot 11, e.g., the distal end of the robot arm such as a wrist flange, and the group of depth data from the depth sensor 12 to the surface of the object 20 located around the robot 11 can be acquired. Further, the depth map information can be generated by transforming the group of depth data acquired from the depth sensor 12 into the three-dimensional position information with reference to the installation position of the robot 11 as the origin, based on the three-dimensional position information of the predetermined portion of the robot 11 where the depth sensor 12 is mounted. The interference region for the robot 11 can be set based on such depth map information. Thus, it is possible to automatically set the motion range of the robot 11 in which the robot 11 and an obstacle such as a peripheral device do not interfere with each other.

Further, since the generated depth map information is three-dimensional information conforming to the shape of an actual object such as a peripheral device when viewed from the robot 11, the shape of the interference region set from such depth map information can be easily anticipated by the user. As a result, the teaching operation of the robot becomes easier.

When the position of the peripheral device is changed, the interference region can be reset by executing the program of the interference region setting sequence again, thereby it is possible to reduce the user's work.

Since the depth sensor 12 is used only when resetting the interference range, only one depth sensor 12 will suffice for it. Thus, the depth sensor 12 can be repeatedly used, and therefore it is possible to reduce the cost.

OTHER EMBODIMENTS

The above-mentioned interference region setting sequence by the robot controller 10 according to an embodiment is executed while the robot 11 is stopped in one posture. However, if the object which may interfere with the robot 11 exists over a wide range around the robot 11, it is difficult to set the range occupied by such object as the interference region by only one-time of the interference region setting sequence. Further, if the shape of the object located around the robot 11 is a combination of complex shapes, it is also difficult to set the interference region by only one-time of the interference region setting sequence. In such cases, it is preferable to repeatedly carry out the above-mentioned interference region setting sequence by several times.

Figure 3:
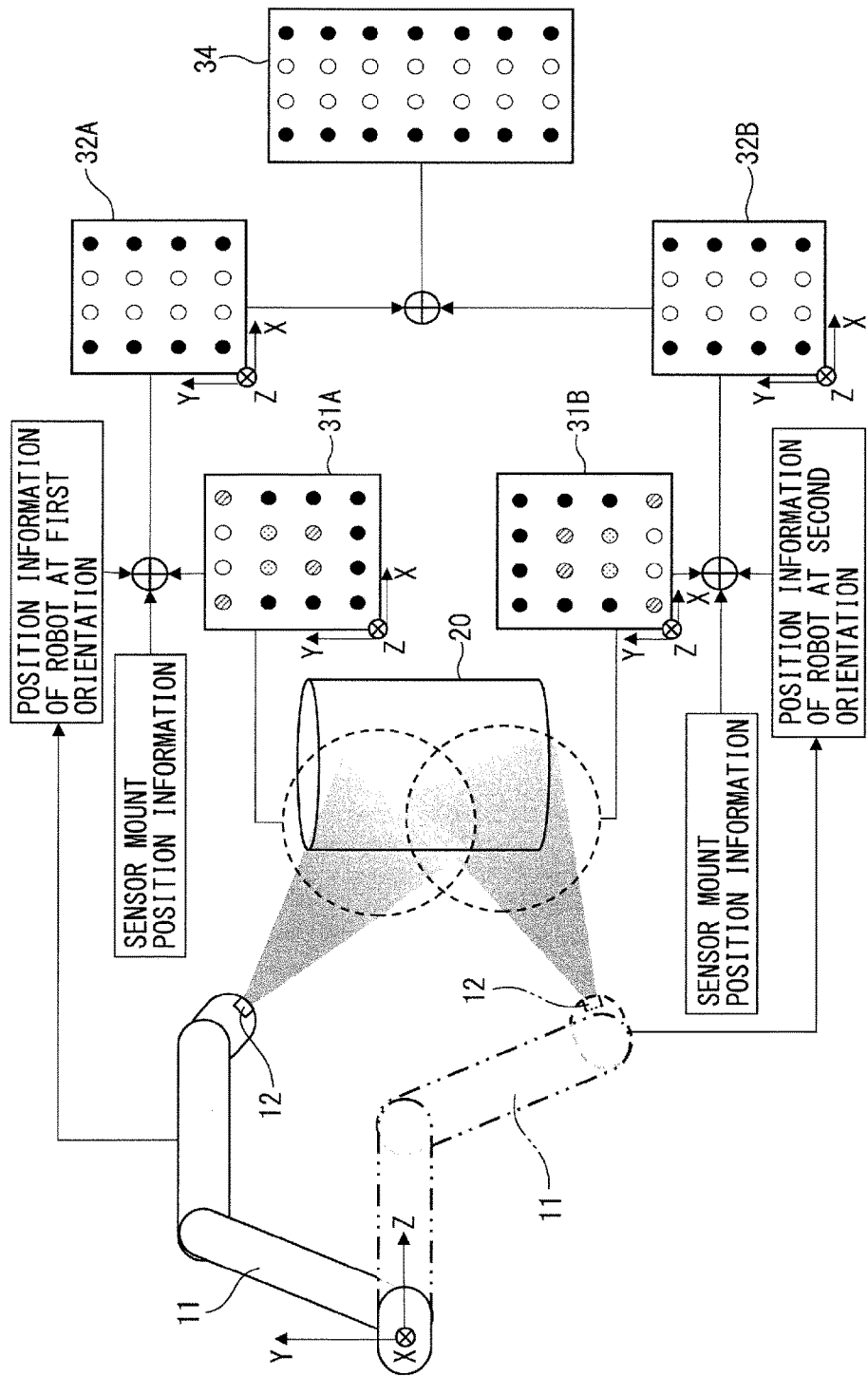
FIG. 3 is a schematic diagram illustrating an interference region setting flow according to another embodiment.

FIG. 3 is a diagram schematically illustrating an example in which the interference region setting sequence are repeatedly carried out by several times.

First, the robot controller 10 stops the robot 11 in a robot-posture (hereinafter, referred to as "first posture") indicated by solid lines in FIG. 3. Then, by the depth sensor 12 mounted at the distal end of the robot 11 arranged at the first posture, the robot controller 10 acquires a group of depth data (e.g., a depth image 31A) from the depth sensor 12 to a plurality of points on the surface of the object 20. In addition, the robot controller 10 generates depth map information (e.g., a depth image 32A) at the first posture, with using the information of the depth image 31A, the position information of the distal end of the robot 11 at the first posture, and the sensor mount position information.

After the depth map information at the first posture is generated, the robot controller 10 moves and stops the robot 11 at another robot-posture (hereinafter, referred to as "second posture") indicated by two-dot chain lines in FIG. 3. Then, by the depth sensor 12 mounted at the distal end of the robot 11 at the second posture, the robot controller 10 acquires a group of depth data (e.g., a depth image 31B) from the depth sensor 12 to a plurality of points on the surface of the object 20. In addition, the robot controller 10 generates depth map information (e.g., a depth image 32B) at the second posture, with using the information of the depth image 31B, the position information of the distal end of the robot 11 at the second posture, and the sensor mount position information.

Further, the depth map generator 15 superimposes the information of the depth images 32A and 32B generated for the respective postures of the robot 11, and generates a depth image 34 including the whole object 20 existing over a wide range. Of course, the number of times for changing the posture of the robot 11 is not limited to two-times. After that, the interference region setting section 16 sets a range to be an interference region for the robot 11 from the generated depth image 34.

By the aforementioned operation, it is possible to set the range occupied by the object existing over a wide range as an interference region. In particular, it is not necessary to install a plurality of depth sensors around the object 20. Therefore, it is possible to set the position of the obstacle by mounting only one depth sensor 12 at the robot 11, changing the posture of the robot 11, and integrating the depth map information generated for respective postures into one depth map information.

While the invention has been described above with reference to typical embodiments, it is to be understood by those skilled in the art that changes and various other changes, omissions, and additions can be made in each of the above-described embodiments without departing from the scope of the invention.

To achieve the object of the invention, the following aspects of the invention and their effects can be provided.

For example, in a first aspect of the invention, the robot controller 10 configured to control the operation of the robot 11, includes the depth acquisition section 13 configured to acquire a group of depth data representing depths from a predetermined portion of the robot 11 to a plurality of on the surface of the object 20 located around the robot 11; a robot position acquisition section 14 configured to acquire three-dimensional position information of the predetermined portion of the robot 11; a depth map generator 15 configured to generate depth map information including three-dimensional position information of the plurality of points with reference to a installation position of the robot as an origin, with using the group of depth data and the three-dimensional position information of the predetermined portion; and the interference region setting section 16 configured to estimate the range occupied by the object 20 from the depth map information, and set this range as an interference region for the robot 11.

According to the first aspect, it is possible to automatically set a motion range of a robot, in which the robot and an obstacle, such as a peripheral device, do not interfere with each other.

In a second aspect, the interference region setting section 16 is configured to estimate the shape of the object 20 from the depth map information, transform this shape into a simplified shape, and set the range occupied by the simplified shape as an interference region for the robot 11.

According to the second aspect, since the shape of the object 20 to be set as an interference region for the robot 11 is transformed into a simplified shape, the amount of data stored in the storage can be reduced. Further, the processing speed at which the robot 11 is operated based on the interference region can be improved, along with reducing noise.

In a third aspect, the robot controller 10 according to the first or second aspect, further includes the depth sensor 12 detachably mounted at the predetermined portion of the robot 11, and measures the depth.

According to the third aspect, an interference region setting sequence can be executed upon mounting of the depth sensor 12 on the robot 11 only when an interference region for the robot 11 is set.

In a fourth aspect, the robot controller 10 according to the third aspect is configured to generate the depth map information every time the robot controller 10 operates the robot 11 so as to change the posture of the robot 11 to which the depth sensor 12 is attached, wherein the interference region setting section 16 is configured to set a range of the interference region for the robot 11 from the depth map information generated for each posture of the robot 11.

According to the fourth aspect, the range occupied by the object 20 existing over a wide range can be set as an interference region for the robot 11.

The invention claimed is:

1. A robot controller configured to control an operation of a robot, the robot controller comprising:
  a processor; and a non-transitory computer readable storage medium storing thereon a computer program product for controlling the robot, comprising computer executable instructions adapted to be executed by the processor to:
  acquire a group of depth data representing depths from a predetermined portion of the robot when the robot is disposed at a predetermined posture to a plurality of points on a surface of an object located around the robot;
  acquire three-dimensional position information of the predetermined portion when the robot is disposed at the predetermined posture;
  generate depth map information including three-dimensional position information of the plurality of points with reference to a installation position of the robot as an origin, using the group of depth data and the three-dimensional position information of the predetermined portion; and
  estimate a range occupied by the object from the depth map information, and set the range as an interference region for the robot.

2. The robot controller according to claim 1, wherein the computer program product further comprises computer executable instructions adapted to be executed by the processor to:
  estimate a shape of the object from the depth map information;
  transform the shape into a simplified shape; and
  set a range occupied by the simplified shape as the interference region for the robot.

3. The robot controller according to claim 1, further comprising a depth sensor detachably attached to the predetermined portion and configured to measure the depth.

4. The robot controller according to claim 3, wherein the computer program product further comprises computer executable instructions adapted to be executed by the processor to: generate the depth map information every time the robot controller operates the robot so as to change a posture of the robot to which the depth sensor is attached, and set a range of the interference region from the depth map information generated for each posture of the robot.

5. The robot controller according to claim 3, wherein the computer program product further comprises computer executable instructions adapted to be executed by the processor to:
  acquire sensor mount position information representing a position of the depth sensor relative to the predetermined portion, and
  generate the depth map information, further using the sensor mount position information.

* * * * *